Jan. 7, 1936.   W. E. URSCHEL   2,026,761
CORN PICKER
Filed March 28, 1931   3 Sheets-Sheet 1
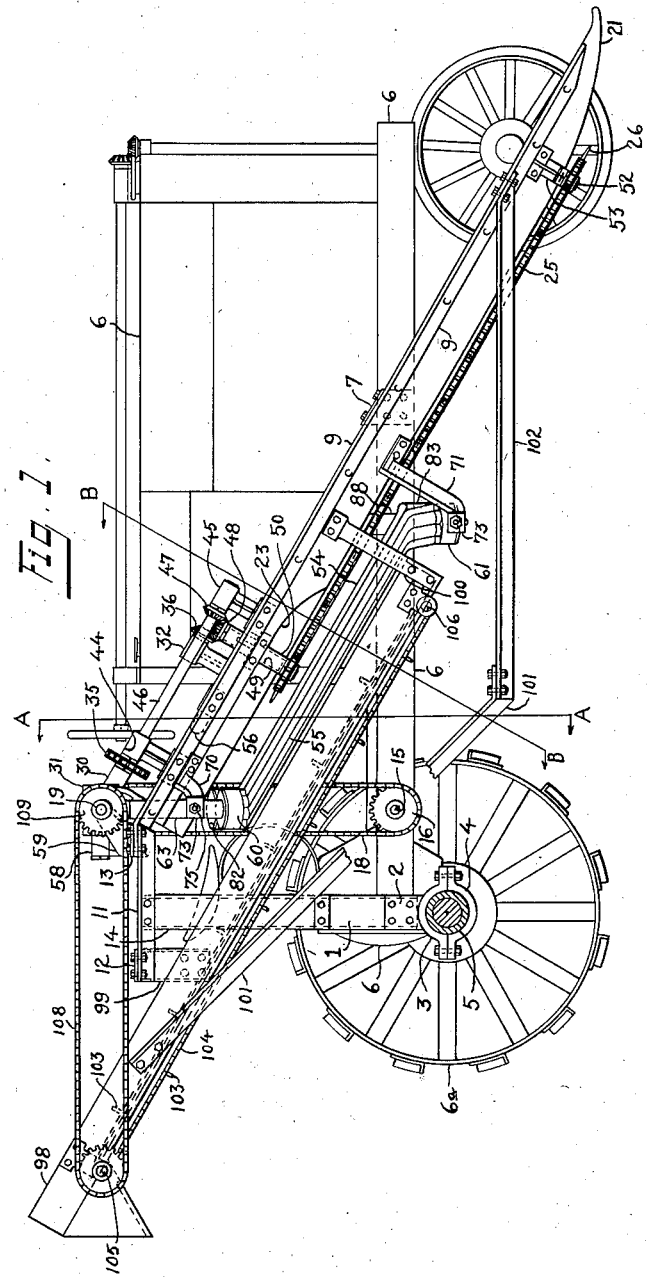
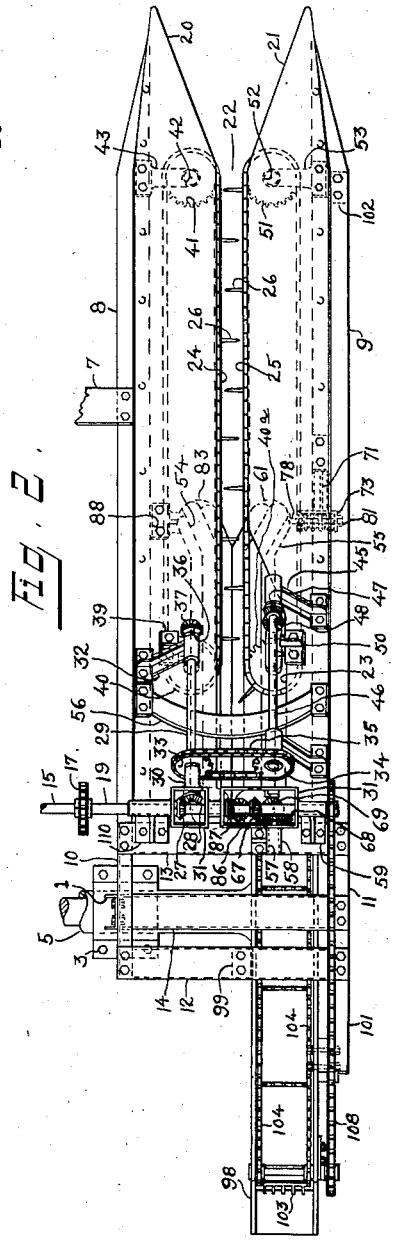
INVENTOR.
William E. Urschel
BY
ATTORNEY

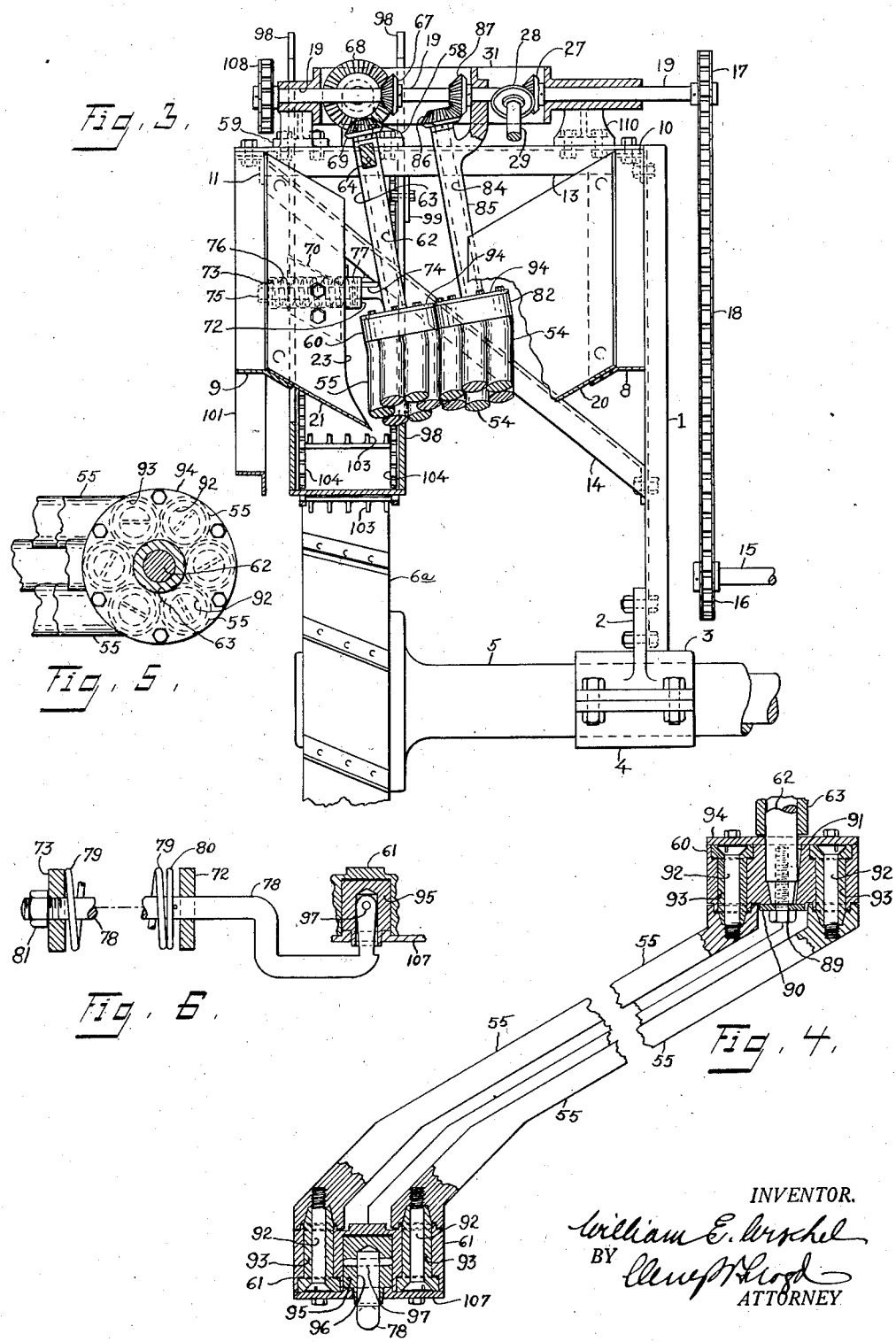

Jan. 7, 1936.　　　　　W. E. URSCHEL　　　　2,026,761
CORN PICKER
Filed March 28, 1931　　　3 Sheets-Sheet 3
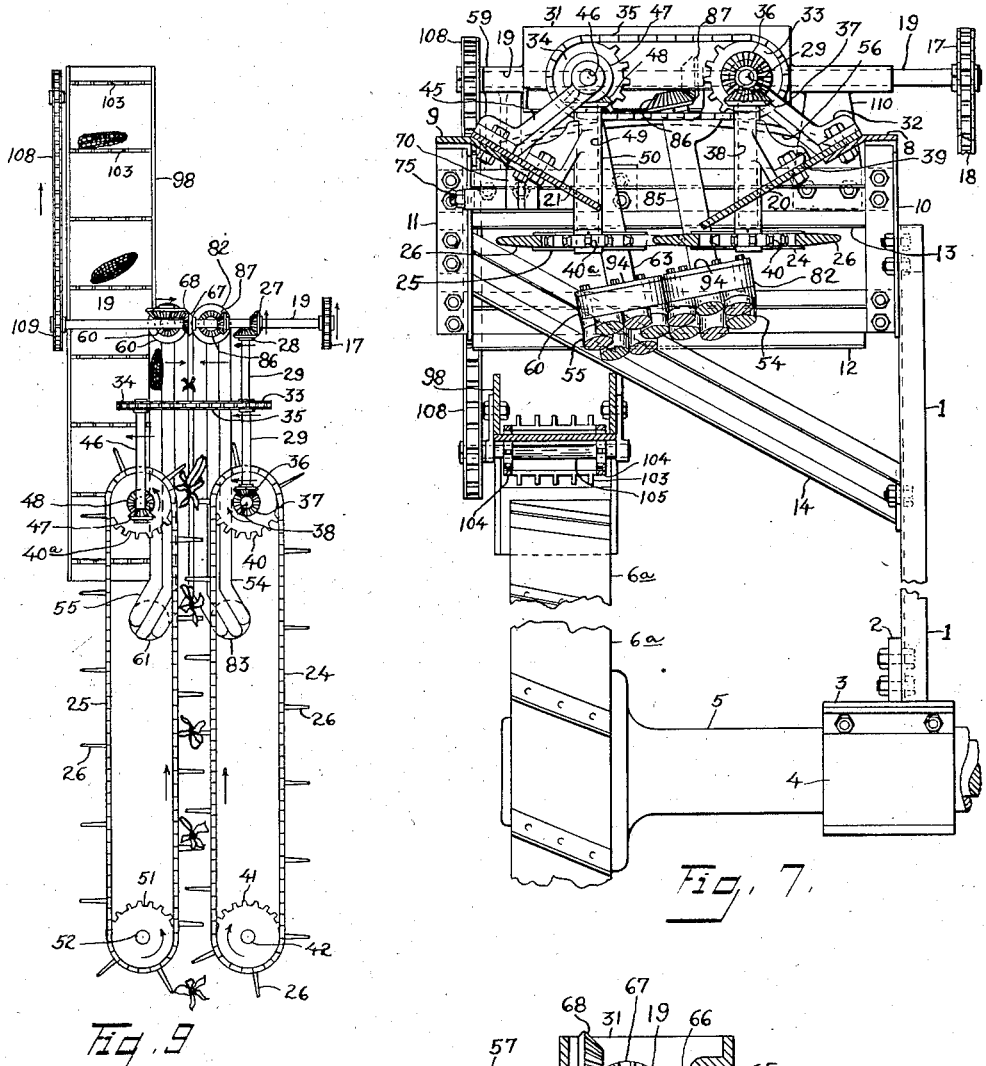
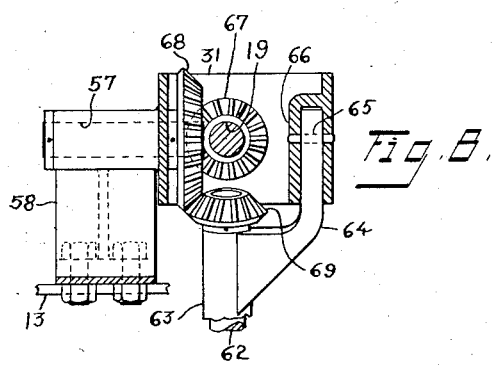
INVENTOR.
William E. Urschel
BY
ATTORNEY Patented Jan. 7, 1936

2,026,761

UNITED STATES PATENT OFFICE 2,026,761

CORN PICKER

William E. Urschel, Valparaiso, Ind.

Application March 28, 1931, Serial No. 525,935

4 Claims. (Cl. 130—5)

The present invention relates to corn pickers and huskers.

One object of the invention is to provide a simple and efficient machine which is moved along rows of growing corn to snap and husk the corn while leaving the picked stalks standing in the field. The corn, after being picked and husked, is elevated by an inclined elevator or conveyor to a box in any suitable wagon drawn behind or alongside of the machine or into any suitable receptacle which may be arranged upon the picker itself.

Another form of the invention is to provide a novel arrangement of roller bars which snap and husk ears of corn in a single operation. At present, conventional corn pickers are constructed with two sets of instrumentalities, one for picking the ears of corn from the stalk, and the other for husking the corn. Such an arrangement results in complicated and heavy structures.

The tremendous loss of grain in the snapping and husking operation, typical of heretofore proposed devices, in the present arrangement and construction is reduced to a minimum. With the heretofore existing arrangement of instrumentalities, much loss of grain resulted, firstly, because the snapping devices were of a shape which dug into the tops of the ears of corn, generally loosening many kernels, and secondly, the ears of corn after being first picked from the stalk with a coincident loss of grain and loosening of kernels were then transferred or conveyed to husking devices which meant greater loss of grain because of the handling of the ears.

With the present arrangement, construction and operation of rollers bars, the picking and husking of the ears is performed in one operation with very little loss of grain.

Another object of the invention is to provide a corn picker which will gather and husk ears of corn from the stalks which have been broken off from their roots by storms or winds before harvesting time.

With the conventional corn pickers employed at the present time, ears of corn are not and cannot be picked or husked from the broken stalks. This condition means that much corn is left behind in the field. To save this corn at present, where using conventional devices, it is necessary for a man to pick it from the broken stalks by hand. By the novel arrangement, construction and operation of gathering chains in conjunction with roller bars in the present invention, all of the corn on broken stalks is picked and husked just the same as the corn which is on unbroken stalks.

Another object of the invention is the construction of a corn picker and husker which may be operated adjacent to one side of a tractor, and attached thereto in such a manner that the mechanism may be advanced over the ground surface by power derived from the traction wheels of the tractor while the power for operating the picker and husker mechanisms is derived directly from the power shaft of the tractor.

With the above and other objects in view, which other objects will appear as the description of the invention proceeds, the invention resides in the novel arrangement, combination and construction of the instrumentalities adapted to pick and husk corn as hereinafter recited. It is understood that many changes in the construction of the invention may be made without departing from the scope of the appended claims.

One form of the invention is illustrated in the accompanying drawings, in which:

Figure 1 is a right hand side elevation of a device embodying the invention;

Figure 2 is a plan view of the device shown in Figure 1;

Figure 3 is an enlarged transverse sectional view taken on the line A—A of Figure 1;

Figure 4 is an enlarged detailed view, partly in section, and partly in elevation, showing the details of construction of the picking and husking roller bars;

Figure 5 is a plan view of the upper portion of the roller bars shown in Figure 4;

Figure 6 is a fragmentary view showing the compression spring arrangement of the lower portion of the roller bars shown in Figure 4;

Figure 7 is an enlarged transverse sectional view taken on the line B—B of Figure 1;

Figure 8 is an enlarged fragmentary view of the driving, swinging and supporting arrangement of the right hand roller bar; and Figure 9 is a diagrammatic view of the drive arrangement of the machine and illustrating the operation of picking, husking and elevating mechanisms.

Like reference characters are used to designate similar parts in the drawings and in the description which follows.

The machine shown in the drawings for the purpose of illustrating the invention comprises a suitable frame, supported at the rear end of the picker mechanism by an upright 1. Said upright 1 is fastened with bolts or other suitable securing means to an upwardly extending lug 2 which may form a part of a casting 3. Castings 3 and 4 are fastened together with bolts and are adapted to fit securely upon the axle 5 of a tractor 6, one wheel 6a of which is shown.

The upright 1 which supports the main frame and mechanisms of the device is preferably mounted on the axle between the supporting wheels 6a of the tractor to permit of a compactness of frame construction. A bracket 7 at the forward left hand side of the picker, fastened by any suitable means to the longitudinal or left side member 8 thereof, is secured with bolts to the frame of said tractor 6. The upright 1, and the bracket 7, support the main frame of the picker and keep it in a rigid and fixed position in relation to the tractor 6.

The main frame of the picker consists of longitudinal or side members 8 and 9 running vertically at approximately a thirty degree angle. Side member 8 has a horizontal extension member 10 fastened with suitable means to the upper end of said member 8 while side member 9 has a similar extension member 11, also running horizontally, fastened to its upper end. Extension members 10 and 11 are securely fastened to cross members 12 and 13. A diagonal brace 14 fastened at its lower end to upright 1 and at its upper end to extension member 11 aids in maintaining the frame and mechanism in a rigid position.

The power for driving the mechanism in the corn picker and husker is derived directly from a power shaft 15 on tractor 6. A chain drive sprocket 16 securely fastened on said shaft 15 drives a sprocket 17 by means of a chain 18.

Sprocket 17 is securely fastened on a shaft 19. Said shaft 19 forms the main shaft of the picker on which all of the gears are fastened for driving the gatherers, roller bars and elevator. Shaft 19 rotates in bearing brackets 59 and 110 attached to cross member 13.

Mounted upon the side members 8 and 9 are two guide plates 20 and 21 so related that they form a trough-like structure 22. The lower margins of the members 20 and 21 are spaced apart as shown. The forward ends of plates 20 and 21 flare outwardly and are used to gather up the stalks which have been broken or are lying on the ground. Said members 20 and 21 guide the stalks into the opening 22 between said plates 20 and 21.

For simple illustration, the guide plates 20 and 21 in the drawings have been shown as being constructed of a single piece of sheet metal. In practice, it may be well to form the guides of two or more pieces of material—such as wood, metal, or a combination of both. The lower flange or flat section of guide 20 is continuous to the roller bars in the rear of the device as shown in Figures 1 and 2, to act as a guide for the corn and also to prevent the husked ears of corn from falling to the ground. Guide 21 has an opening 23 formed over the roller bars to permit husked ears of corn to pass through to an elevator later to be described.

Beneath the guides 20 and 21 are stalk gathering chains 24 and 25 formed with extending fingers 26 for pushing the stalks of corn up to the picking and husking rolls. The drive for the gathering chains 24 and 25 consists of a beveled gear 27 fastened on shaft 19. Said gear meshes with another beveled gear 28 fastened on a shaft 29. One end of shaft 29 rotates in a bearing 30. Bearing 30 forms part of a casting 31. The forward end of shaft 29 rotates in a bearing bracket 32 which is fastened to guide 20 and to side member 8.

Close to bearing 30 on shaft 29 is fastened a chain sprocket 33 which drives chain sprocket 34 by means of a chain 35. Fastened to the extreme forward end of the shaft 29 is a beveled gear 36 which meshes with another beveled gear 37. Beveled gear 37 is fastened on a shaft 38 which rotates in a bearing bracket 39 fastened to guide 8. The lower end of shaft 38 has a chain sprocket 40 fastened to it. Said sprocket 40 drives the gathering chain 24. Gathering chain 24 rotates at its forward end on a chain sprocket 41 fastened to a shaft 42 in a bearing bracket 43. Bracket 43 is fastened to the under side of guide 20 and side member 8.

Sprocket 34 fastened on a shaft 46 rotates in bearing brackets 44 and 45 which are attached to guide 21 and side member 9. The forward end of shaft 46 has a beveled gear 47 fastened to it. Said gear 47 meshes with another beveled gear 48 fastened on a shaft 49 which rotates in a bearing bracket 50 fastened to guide 21. The lower end of shaft 49 has a chain sprocket 40a fastened to it. Sprocket 40a drives the gathering chain 25. Gathering chain 25 rotates at its forward end on a chain sprocket 51 fastened on a shaft 52 which rotates in a bearing bracket 53 fastened to the under side of the guide 21 and the side member 9.

By referring to the diagrammatic view, Figure 9, it will be noted that beveled gears 36 and 47 are so arranged that the extending fingers 26 on chains 24 and 25 will push the corn stalks backwardly towards the roller bars as indicated by the arrows.

The mechanism employed to pick and husk the ears of corn in a single operation comprises two oppositely disposed sets of roller bars 54 and 55 disposed in the path of the standing corn which is being forced through the device by the projecting fingers 26 on chains 24 and 25, and the forward movement of the mechanism. Roller bars 54 and 55 are so placed and operate in such a manner that, as the standing corn is being forced through them, the ears of corn are above the bars.

As the entire mechanism is being moved forward by the traction power of tractor 6 and the corn being rooted in the ground, the action of the roller bars 54 and 55 pressing tightly against the stalks of corn is such that it will not permit the ears of corn to be drawn through. The corn will be snapped off the stalks by being forced out of the husks, leaving the picked and husked ears above the roller bars 54 and 55 to drop into the elevator through the opening 23. The husk and picked stalks pass between the roller bars 54 and 55 and remain in the field.

Roller bars 54 and 55 are shown tilted towards the elevator at an angle to assist the husked ears to roll in the direction of the elevator. This does not mean that the roller bars 54 and 55 cannot be installed differently, and an arm extending over the roller bars be used to force the corn towards the elevator.

To prevent leaves and tops of corn stalks from becoming entangled in sprockets 33 and 34, and in chain 35, a bridge element 56 is fastened to guides 20 and 21 and side members 8 and 9. Bridge element 56 also holds guides 20 and 21 in suitably spaced positions as shown in Figure 2.

Roller bars 55 are secured together at the rear end by a cylindrical bearing block 60 and at the forward end by an end bearing 61. Roller bars 55 are free to revolve in said bearings. A roller bar shaft 62 (see Figure 3) rotates in a bearing 63 and at its upper end has an arm 64 extending upwardly (see Figure 8) which is held in place by a single pin 65. Casting 31 is formed with a lip 66 which fits over the arm 64. When roller bars 55 are pushed away from roller bars 54, as the stalks of corn are passing through, the arm 64, having a rotatable fit in the lip 66, moves to the right or to the left to allow the different thicknesses of corn to pass through.

Roller bar shaft 62 is driven by a beveled gear 67 fastened on shaft 19. The latter meshes with a larger beveled gear 68 which in turn meshes with a smaller beveled gear 69 fastened on a shaft 62. As can be clearly seen in Figure 8, the reason for having three gears to drive shaft 62 is so that when roller bars 55 are spread apart, and arm 64 works from left to right, beveled gear 69 will also be able to move from left to right and always be in mesh with the gear. Gear 68 is fastened to shaft 57 which rotates in bearing bracket 58 (see Figure 2).

To keep roller bars 55 tight against corn stalks passing between roller bars 54 and 55, a compression spring arrangement is used. Brackets 70 and 71 are formed with two arms 72 and 73. A bar 74 (see Figure 3) either forming a part of or fastened to bearing 63 passes through openings 72 and 73 of bracket 70 and is held in place by a nut 75. A compression spring 76 is held in place by the bar 74 which presses against a washer 77 held in a fixed position on bar 74 by a pin or otherwise.

As the roller bars 55 open up to allow stalks to pass through, washer 77 is pushed against the compression spring 76 which in turn presses against the washer and presses the roller bars 55 tightly against the stalks. The forward bracket 71 with two arms 72 and 73 designated by the same numerals as the arms of bracket 70 for clearness, operates in the same manner as the rear spring mechanism.

Referring to Figure 6, it will be noted that rod 78 passes through openings in arms 72 and 73. Compression spring 79 held in place by the rod 78 presses against washer 80 and presses roller bars 55 against the stalks passing between roller bars 54 and 55. A nut 81 keeps rod 78 in place and is used for adjustment purposes.

Summarizing the description of the device, it will be seen that when the stalks are passing between roller bars 54 and 55, roller bars 54 do not move from left to right but remain stationary, while roller bars 55 open up enough for the stalks to pass through at the same time the compression springs 76 and 79 press roller bars 55 tightly against the stalks. This pressure, due to the novel shape and movement of the bars in this corn picking and husking machinery, snaps the ears of corn from the standing or broken stalks in such a manner that the husks are left behind unbroken from the stalks.

Roller bars 54 are secured together at the rear end by a cylindrical bearing block 82 and at the forward end by an end bearing 83. Roller bars 54 and 55 are free to revolve in these bearings. The roller bar shaft 84 (see Figure 3) rotates in bearing 85. Bearing 85 forms a part of casting 31. Roller bar shaft 84 is driven by a beveled gear 86 fastened at its upper extremity and which meshes with another beveled gear 87 fastened on shaft 19. The end bearing 83 rotates and is held in position in the bearing bracket 88. When the standing corn is passing between roller bars 54 and 55, roller bars 55 are pushed away from roller bars 54 while roller bars 54 are held in a stationary position. A compression spring arrangement can be used with both roller bars 54 and 55 without making any difference in the novel manner of picking and husking the corn.

Referring to the plan view, Figure 2, it will be noted that the forward end of roller bars 54 and 55 are so shaped that a U-shaped opening is formed to permit ready access of the standing corn, the back end of roller bars 54 and 55 are brought close together so that there is no possible chance of the unpicked ears of corn to pass through (see Figure 3 and Figure 7).

The shape of roller bars used or illustrating the invention is shown in Figures 1 and 4. Such shape may be changed from thirty degrees as shown in Figure 1 to a greater or lesser degree of obliquity without departing from the scope of the invention.

Roller bars 54 and 55 are both constructed and operated in the same manner. The difference between them is that roller bars 54 are shaped at their forward end so as to open to the left and roller bars 55 are shaped to open to the right. For this reason, a detailed description of roller bars 55 will suffice to explain the functions performed by both.

Reference should now be had to Figure 4. Roller bar shaft 62, rotating in bearing 63, passes through an opening machined in cylindrical bearing block 60. Machine screw 89 passing through hole in washer 90 screws into roller bar shaft 62. A keyway 91 machined in roller bar shaft 62 and bearing block 60 keeps shaft 62 and block 60 in contact so that when the shaft 62 is rotating, bearing block 60 must also rotate. Roller bars 55 are fastened to the cylindrical bearing block 60 with machine screws 92 passing through small bearings 93 and screwed into the roller bars 55 as shown, keeping the bearings 93 in tight contact with its respective roller bar. Bearings 93 themselves do not rotate in bearing block 60, but are a loose fit to permit the bearing block 60 to rotate around bearings 93 at the same time move roller bars 55 from one position to another.

When shaft 62 rotates, bearing block 60 also rotates while roller bars 55 are rotated around the shaft 62, but do not rotate themselves. For instance, the top side of any roller bars 55 will always remain at the top side no matter where it has been rotated around the bearing shaft 62.

A study of plan view, Figure 5, of the upper portion of roller bars 55 clearly shows what occurs. A plate or cover 94 fastened on bearing block 60 keeps any foreign matter from working into the bearings. At the forward end, roller bars 55 are fastened to bearings 93 with screws 92 in the same manner as the rear end of roller bars 55. Front end bearing block 61 is rotated by the driving force of the rear shaft 62 and rotates around a cylindrical block 95 which fits loosely into the machined center of end bearing block 61. Cylindrical block 95 has a machined center into which the bracket 96 is fastened. A pin 97 passes through the cylindrical block 95 and through the bracket 96 as shown in Figure 4 and Figure 6. The portion of the bracket that fits into the cylindrical block 95 is shaped as shown in Figure 6 to permit block 61 to move on the pin 97. This permits roller bars 54 and 55 to adjust themselves to any irregularities in position. A plate or cover 107 fastened on bearing block 61 keeps foreign matter from working into the bearings.

Roller bars 54 and 55 do not rotate themselves, as has been explained, and are spaced so that the bars of one section when contiguous to the bars of the other section, lie in different horizontal planes, a bar of one section at the inner sides of said sections always being between two bars of the opposite section (see Figure 3 and Figure 7). In passing through the horizontal plane, defined by the innermost reach of the bars of both sections, the bars of one section alternate with the bars of the other section, the bars of both sections moving downwardly to bisect such plane, first at one side and then at the other.

The result of the operation of bars 54 and 55 is to pull the foliage of the standing stalk therebetween until the base of the ear of corn engages the bars 54 and 55 to prevent a further pull against the ear of corn at the same time the standing stalk is being drawn through as before the ear of corn came in contact. This pull of the roller bars against the ear of corn, snaps it away at the base near the stalk leaving the husk on the stalk. There is little or no loss of grains and no loosening thereof of any material moment.

Stalks which have been broken by wind or storm, are raised by the gathering chains 24 and 25, and forced between the roller bars 54 and 55. Once the stalks get between roller bars 54 and 55 they are held in a tight grip by the pressure of the compression springs and picked and husked in the same manner as those stalks which are upright in the ground. The successful picking is accomplished because of the tight grip of the roller bars on the stalk and the downward movement of the bars.

The ear of corn after being picked and husked rolls into an elevator of any convenient construction which elevator conveys the ear of corn to a wagon drawn behind or alongside the tractor or a suitable receptacle which may be arranged upon the picker itself.

The elevator 98 used in illustrating the conveying of the ears of corn is attached at the rear end of the main frame of the corn picker by a bracket 99. Bracket 99 is fastened to the cross member 12 of the main frame. At the forward end, a bracket 100 is fastened to elevator 98 and side member 9. A truss arrangement composed of two angles 101 and 102 assists in bracing the elevator as well as the guide 21.

The corn is elevated by means of extending fingers 103 which form a part of chains 104, one for each side of fingers 103. Drive chain 104 rotates on sprockets fastened to shafts 105 at the rear end and 106 at the forward end. Shafts 105 and 106 rotate in bearing brackets fastened to the body of the elevator 98. Drive chains 104 are driven by chain 108 which in turn is driven away by a sprocket 109 on shaft 19.

By referring to the diagrammatic view, Figure 9, in which the arrows show the direction in which the mechanism is being driven, a clear understanding of the operations performed is shown. The stalks of corn which are standing up or which were lying on the ground and have been raised by the guides 20 and 21, Figure 2, are forced between the roller bars 54 and 55. Roller bars 54 and 55 by reason of their movements tend to pull the stalk down. As the ear of corn reaches the roller bars 54 and 55 and cannot pass through it is snapped off at the base inside the husk. As the bars continue to pull the stalk and husk downward, the snapped ear of corn slips through the husk and rolls into the conveyor while the stalk is pulled through and remains in the field. The picked and husked ears are then elevated to a sufficient height as to drop into a convenient wagon box drawn behind or alongside, or a receptacle built upon the machine.

From the foregoing description of the construction of the present corn picker and husker, it will be noted that a simple and efficient and economical means for carrying out the objects of the invention has been provided. While the elements described are adapted to perform the functions set forth, it is obvious that various changes in form, proportion, and details of construction may be resorted to without departing from the scope of the appended claims.

I claim:

1. In a corn picker, two series of bars having straight parallel sections, other sections at an angle therewith, and parallel end sections extending angularly thereto, rotatable members providing bearings for said end sections at equal radii from the axis of rotation thereof, means for rotating said members, such rotation causing planetary movement to each series of bars and intermeshing the said straight sections of the bars of one series with the corresponding sections of the other series to compress and draw the stalks and husks of corn therebetween, the movement of the individual straight sections of the bars in each series being oblique to their longitudinal axis whereby such stalk and husk are moved obliquely thereto, and means for holding said two series of bars yieldingly in said intermeshing relation.

2. In a corn picker or the like, squeeze bars having parallel opposed sections, other sections at an angle therewith, and parallel end sections arranged angularly to said opposed sections, and said other sections, said bars being arranged in two series, each series having rotatable end members providing journals for the end sections of said bars, the journals in each end member being at the same radius from the axis of rotation thereof, means for forcing said two series yieldingly together, and means for rotating said end members whereby the opposed bars of said several series are caused to move in intersecting elliptical paths normal to the axis of rotation of said end members to cause the opposed sections of one series to mesh with those of the other whereby the stalk and husk of said corn are engaged and drawn therebetween.

3. A corn picker comprising opposed series of complemental bars having straight main sections, receiving sections at an obtuse angle therewith, and angularly arranged end sections, the central sections of the bars extending in parallelism obliquely to the vertical and the end sections extending vertically, rotatable end plates for each end of each series of bars and providing journals for the end sections of said bars at equal radii from the axis of rotation of said end plates, the principal axis of said journals being parallel to the axis of rotation of said plates, means for imparting relative rotative movement to said plates, said series of bars being placed closely together so that as the plates are rotated the bars of the opposed series are carried into mesh along tangential arcs, the elevation of all parts of said bars remaining the same during the revolving thereof, and means for holding said series yieldingly close together.

4. A corn picker comprising two sets of bars having parallel sections, each of said bars having a central section disposed angularly to the vertical, a second section at an obtuse angle with said central section, and end sections substantially vertical, means for moving said bars while retaining the central sections of said bars in such state of parallelism and angularity to compress and draw the stalk and husk of said corn therebetween to force the ear therefrom, all parts of said central sections being maintained substantially at their same respective elevations during such movement, and spring means to hold one set of bars yieldingly in close relationship with the other.

WILLIAM E. URSCHEL.